US006706095B2

(12) United States Patent
Morgan

(10) Patent No.: US 6,706,095 B2
(45) Date of Patent: Mar. 16, 2004

(54) CYCLONIC SEPARATING APPARATUS

(75) Inventor: Hywel Douglas Morgan, Bristol (GB)

(73) Assignee: Dyson Limited, Wiltshire (GB)

( * ) Notice: Subject to any disclaimer, the term of this patent is extended or adjusted under 35 U.S.C. 154(b) by 25 days.

(21) Appl. No.: 10/168,453

(22) PCT Filed: Dec. 1, 2000

(86) PCT No.: PCT/GB00/04612

§ 371 (c)(1),
(2), (4) Date: Jun. 21, 2002

(87) PCT Pub. No.: WO01/45853

PCT Pub. Date: Jun. 28, 2001

(65) Prior Publication Data

US 2002/0189451 A1 Dec. 19, 2002

(30) Foreign Application Priority Data

Dec. 22, 1999 (GB) ............................................ 9930332

(51) Int. Cl.[7] ................................................ B01D 45/12
(52) U.S. Cl. ............................ 95/268; 55/340; 55/430; 55/433; 55/459.1
(58) Field of Search ......................... 55/423, 428, 433, 55/430, 429, 459.1, 338, 339, 340; 95/268

(56) References Cited

U.S. PATENT DOCUMENTS

| | | | | |
|---|---|---|---|---|
| 2,039,692 A | | 5/1936 | Van Tongeren | |
| 3,426,513 A | * | 2/1969 | Bauer | 55/459.1 |
| 6,398,834 B2 | * | 6/2002 | Oh | 55/424 |
| 6,432,154 B2 | * | 8/2002 | Oh et al. | 55/423 |

FOREIGN PATENT DOCUMENTS

| | | |
|---|---|---|
| GB | 670752 | 4/1952 |
| GB | 2 136 325 A | 9/1984 |
| GB | 2 298 598 A | 9/1996 |
| JP | 0 513 807 6 | 6/1993 |

* cited by examiner

*Primary Examiner*—Robert A. Hopkins
(74) *Attorney, Agent, or Firm*—Morrison & Foerster LLP

(57) ABSTRACT

Cyclonic separating apparatus (10) comprises a cyclone body (12) having an inlet (16) for introducing dirt-laden air into the cyclone body (12) in a tangential manner. A central outlet (18) is provided for conducting cleaned air out of the cyclone body (12). The apparatus (10) further comprises a dirt-collecting chamber (14) having an entry portion (30) communicating with the interior of the cyclone body (12) and a collecting portion (32). The apparatus (10) further comprises an air return duct (42) having a first end communicating with the collecting portion (32) of the dirt-collecting chamber (14) and a second end communicating with the interior of the cyclone body (12). This arrangement allows a proportion of the main airflow to be bled into the dirt-collecting chamber (14) and returned to the cyclone body (12) without passing back along the entry portion (30).

26 Claims, 3 Drawing Sheets

CYCLONIC SEPARATING APPARATUS

The invention relates to cyclonic separating apparatus and to a method of separating dirt from dirt-laden air. Particularly, but not exclusively, the invention relates to cyclonic separating apparatus suitable for use in a vacuum cleaner.

Cyclonic separating apparatus is well known. In such apparatus, the dirt-laden air is introduced to the interior of a cyclone body in a tangential manner. The air follows a helical path around the interior surface of the cyclone body so that centrifugal forces act on the entrained dirt. At the bottom of the cyclone body, the airflow reverses its direction of travel parallel to the axis of the cyclone body and the dirt is separated from the main airflow. The separated dirt collects at the bottom of the cyclone body whilst the cleaned air exits the apparatus via a centrally located outlet at the top of the cyclone body. Examples of the application of this type of separating apparatus to domestic vacuum cleaners are shown in EP 0 042 723, U.S. Pat. Nos. 5,160,356 and 5,078,761.

One disadvantage of this type of arrangement is that, as the amount of collected dirt increases, the risk of that collected dirt being re-entrained into the airflow increases. Some attempts have been made to alleviate this problem by providing a dirt collection chamber, separate from the cyclone body, into which the collected dirt is transferred and in which it is allowed to accumulate. The cylinder vacuum cleaner manufactured by Electrolux and marketed under the name "CYCLONE POWER BAGLESS HOME CLEANING SYSTEM" (Model Number Z58102T) incorporates such a feature. A similar arrangement is shown in TWO 9611047. In theory, the collected dirt is kept separate from the main airflow which reduces the risk of re-entrainment so that larger volumes of separated dirt can be collected before the apparatus requires to be emptied. However, because the dirt-collection chamber is closed in all areas except at the inlet thereto, any air which enters the dirt-collection chamber is forced to follow a circuitous path and must exit the dirt-collection chamber via the inlet. This leads to a not insignificant amount of turbulence inside the dirt-collection chamber which can lead to previously separated dirt being carried back into the mainstream airflow by the returning air. Another disadvantage of the turbulent conditions existing within the closed dirt-collection chamber is that the separated dirt is carried to many different parts of the dirt-collection chamber. This makes the emptying of the dirt-collection chamber more complicated especially if it is desired to make use of emptying means which allow the user to avoid being exposed to the contents of the dirt-collection chamber.

It is an object of the present invention to provide cyclonic separating apparatus in which the risk of re-entrainment of separated dirt is reduced. It is a further object to provide cyclonic separating apparatus in which the capacity of the apparatus to collect dirt is improved. It is a still further object to provide cyclonic separating apparatus in which the risk of re-entrainment of separated dirt is reduced and the capacity of the apparatus to collect dirt is simultaneously increased. It is a still further object of the invention to provide cyclonic separating apparatus which can be easily and conveniently emptied in a manner which allows the user to avoid being exposed to the dirt collected in the dirt-collection chamber. It is a still further object of the invention to provide a method of separating dirt from dirt-laden air in which the risk of re-entrainment of separated dirt is reduced.

The invention provides cyclonic separating apparatus as set out in claim 1. The invention also provides a method of separating dirt from dirt-laden air as set out in claim 21. Preferred and advantageous features are set out in the subsidiary claims.

The provision of an air return duct communicating with the collecting portion of the dirt-collection chamber and with the interior of the cyclone body provides a separate exit path via which air entering the dirt-collection chamber can return to the cyclone body. This has a number of advantages. Firstly, the airflow within the dirt-collecting chamber is less turbulent so the risk of re-entrainment of dust is reduced. Also, since little or no air is reintroduced to the main airflow in the cyclone body via the entry portion, there is less disturbance to the main airflow. Thirdly, by allowing a small amount of air to flow through the dirt-collection chamber, the separated dirt and fibers can be encouraged to collect in a defined area of the collecting portion from which the separated dirt and fibers can easily be emptied, if required without exposing the user to the collected dirt.

It is preferred that the second end of the air return duct approaches the interior of the cyclone body in a direction which is inclined at an acute angle to the direction of flow within the cyclone body at the point of communication therewith. This is advantageous because, in use, the flow of the main airflow past the second end of the air return duct causes, by the venturi effect, air to be drawn out of the dirt-collecting chamber and into the interior of the cyclone body. This in turn helps to smooth the airflow path through the dirt-collecting chamber.

An embodiment of the present invention will now be described, by way of example only, with reference to the accompanying drawings, in which.

Figure 1:
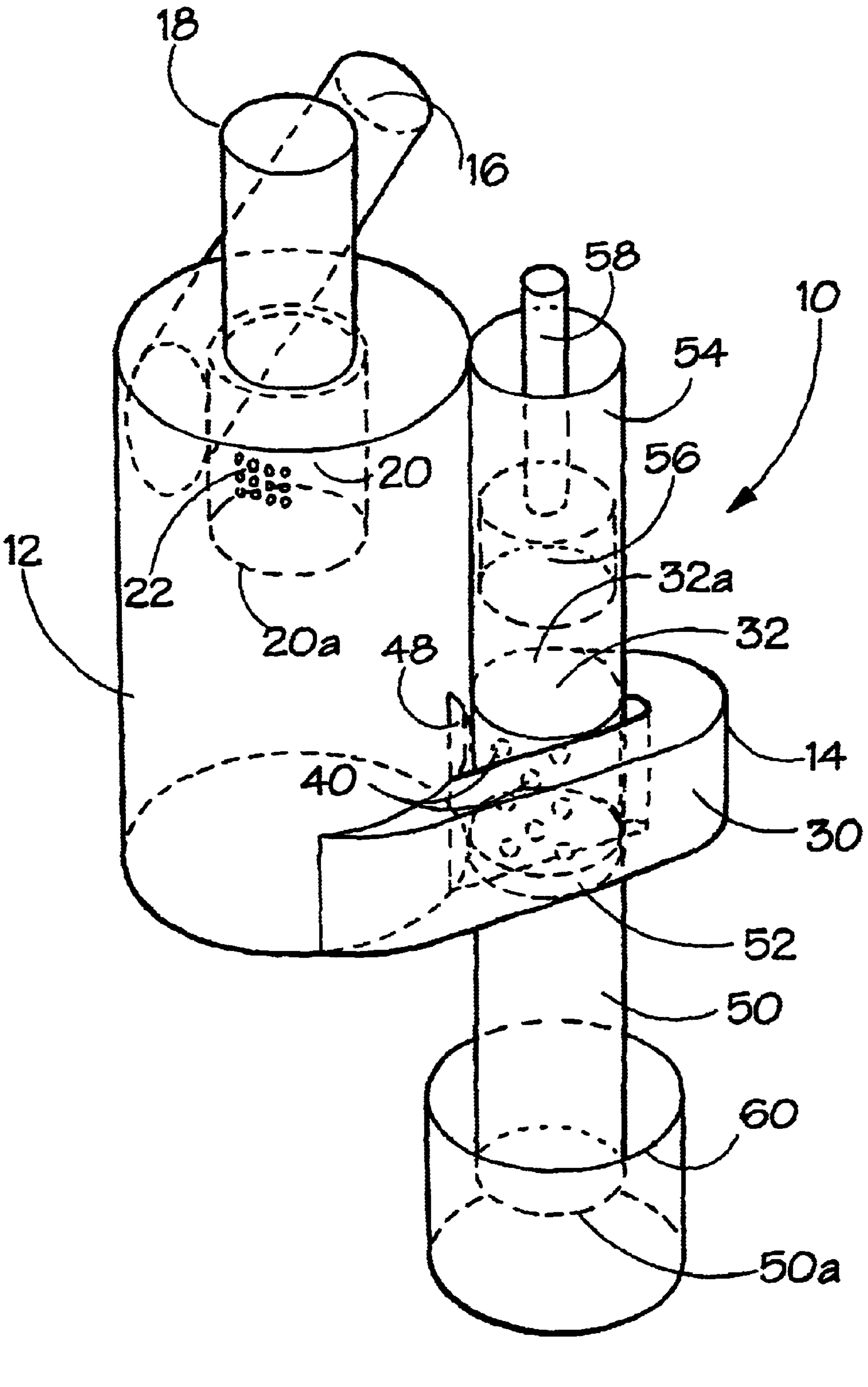
FIG. 1 is a perspective view of cyclonic separating apparatus according to the invention.

The Figures illustrate cyclonic separating apparatus 10 according to the invention. The apparatus 10 is particularly suitable for inclusion in cyclonic vacuum cleaning apparatus. The cyclonic separating apparatus 10 comprises a cyclone body 12 and a dirt-collecting chamber 14. The cyclone body 12 is generally cylindrical in shape. The cyclone body 12 has a dirt-laden air inlet 16 which is arranged to communicate with the interior of the cyclone body 12 in a tangential manner. The cyclone body 12 also has an outlet 18 which is located centrally of the upper end of the cyclone body 12 and coaxially therewith. The diameters of the inlet 16 and the outlet 18 are substantially the same. A perforated shroud 20 is sealingly mounted on the upper end of the cyclone body 12 and depends therefrom into the interior of the cyclone body 12. The shroud 20 is coaxial with the cyclone body 12 and the outlet 18 and its distal end 20*a* is closed. The shroud 20 has a multiplicity of perforations 22 extending therethrough to allow air entering the cyclone body 12 via the inlet 16 to exit via the outlet 18. The function and purpose of the shroud 20 is to reduce the risk of fluff and fine fibers passing through the cyclone body 12 and exiting via the outlet 18, as described in the U.S. '761 prior art mentioned above.

Figure 3:
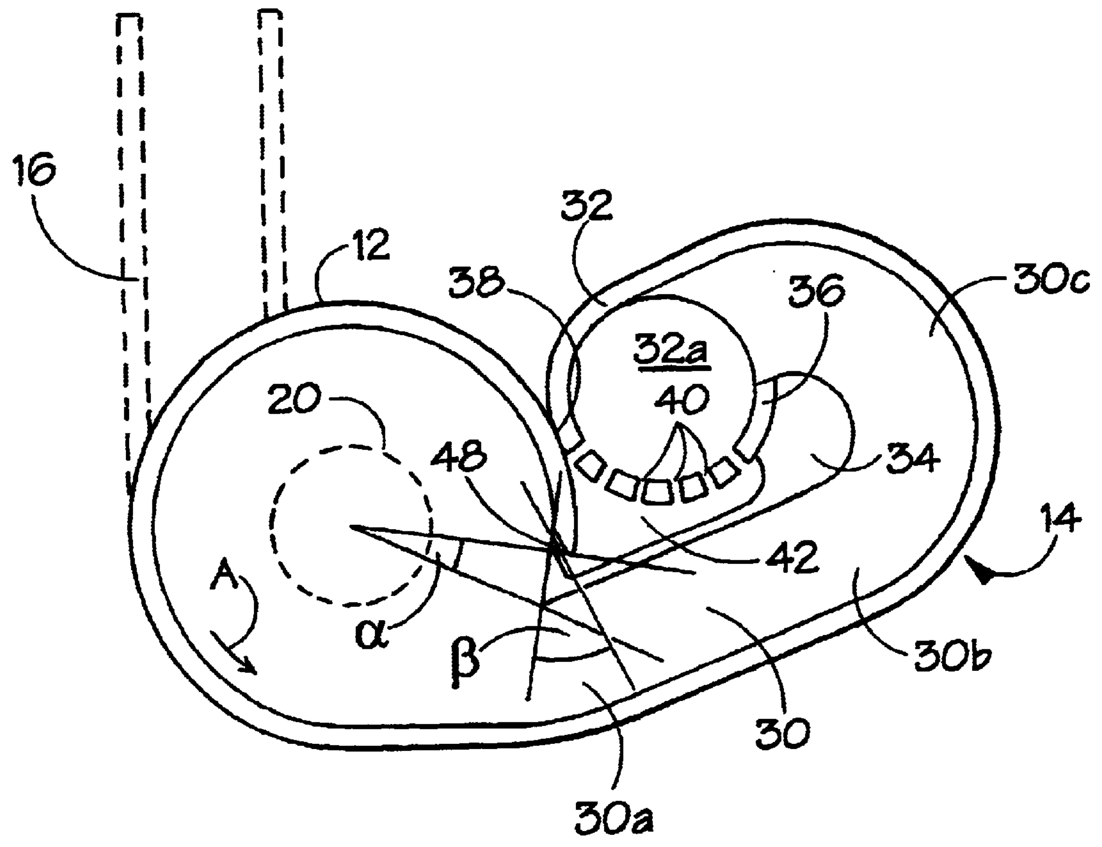
FIG. 3 is a sectional view taken along line III-III of FIG. 2.

The dirt-collecting chamber 14 communicates with the cyclone body 12 at the lower end thereof, i.e. at the end thereof remote from the inlet 16 and the outlet 18. The dirt-collecting chamber 14 extends laterally away from the cyclone body 12 and, when viewed from above, has a generally U-shaped configuration (see FIG. 3). The dirt-collecting chamber 14 has an entry portion 30 which takes the form of a tangential offtake leading from the cyclone body 12 to a collecting portion 32. The entry portion 30 has a mouth portion 30*a* which communicates with a linear portion 30*b* leading to a U-shaped portion 30*c*. Each of these portions 30*a*, 30*b*, 30*c* has a generally rectangular cross section seen in the direction of flow along the entry portion 30. However, the external walls 34 which delimit the entry portion 30 in the lateral direction are smoothly curved, at least on the inside, so that they incorporate no sharp bends or sudden changes of direction.

The collecting portion 32 comprises a cylindrical chamber 32*a* into which the end of the U-shaped portion 30*c* remote from the mouth portion 30*a* opens. The wall 36 which delimits the cylindrical chamber 32*a* meets the wall of the cyclone body 12 at the point 38 so as to form an airtight seal therewith. The portion of this wall 36 extending between the point 38 and the U-shaped portion 30*c* and facing the inner portion 30*b* has a plurality of apertures 40 extending therethrough. As can be seen in FIG. 1, the apertures 40 are arranged in horizontal rows with the apertures of each row being offset with respect to those of the adjacent rows.

The apertures 40 communicate with an air return duct 42 which is delimited partly by the wall 36 which delimits the collecting portion 32, partly by the wall 34 which delimits the entry portion 30, and partly by the wall of the cyclone body 12. The air return duct 42 is also delimited by upper and lower walls 44, 46. The air return duct 42 has an outlet comprising an aperture 48 extending through the wall of the cyclone body 12 so that the air return duct 42 communicates with the interior of the cyclone body 12. The aperture 48 is located in the wall of the cyclone body 12 so that it opens into the interior of the cyclone body 12 downstream of the mouth portion 30*a* of the dirt-collecting chamber 14, seen in the direction of flow of incoming dirt-laden air (arrow A). The circumferential spacing α between the downstream edge of the mouth portion 30*a* and the upstream edge of the aperture 48 is kept relatively small so that any disruption to the cyclonic flow of the main airflow circulating within the cyclone body 12 is minimised. The circumferential spacing ox is ideally approximately 15° but can be as much as 40°.

The aperture 48 is also inclined at an acute angle β to the direction of flow A of the main airflow within the cyclone body 12 at the point at which the aperture opens into the interior of the cyclone body. The acute angle β is shown here as approximately 30° but can be varied between 20° and 50°. The inclination of the aperture 48 reduces the risk of air which is reintroduced to the interior of the cyclone body 12 via the air return duct 48 causing disruption to the main airflow as it enters. However, it is also desirable that air within the air return duct 48 is drawn into the cyclone body 12 by the main airflow by way of the venturi effect.

The collecting portion 32 of the dirt-collecting chamber 14 is provided with means for removing collected dirt therefrom. Depending beneath the cylindrical chamber 32*a* is a cylindrical conduit 50 which has a diameter similar to that of the cylindrical chamber 32*a*. The floor 52 of the cylindrical chamber 32*a* is made slidingly or pivotably movable (in any known manner) in order to allow it to be displaced away from the position (shown in solid lines in FIG. 2) in which it forms a barrier between the cylindrical chamber 32*a* and the interior of the cylindrical conduit 50. In the displaced position (shown in dotted lines in FIG. 2), the cylindrical chamber 32*a* communicates directly with the interior of the cylindrical conduit 50. The lower end 50*a* of the cylindrical conduit 50 is open.

A second cylindrical conduit 54 communicates with the cylindrical chamber 32*a* on the upper side thereof. The second cylindrical conduit 54 is axially aligned with both the cylindrical chamber 32*a* and the cylindrical conduit 50. Again, the diameter of the second cylindrical conduit 54 is essentially similar to that of the cylindrical chamber 32*a*. A plunger 56 is slidably mounted within the second cylindrical conduit 54. An actuating member 58 is fixedly attached to the upper surface of the plunger 56. The configuration and dimensions of the second cylindrical conduit 54, the cylindrical chamber 32*a*, the cylindrical conduit 50 and the plunger 56 are such that the plunger 56 can be caused to move from a position in which it is wholly located within the second cylindrical conduit 54 to a position in which is it wholly located within the cylindrical conduit 50. In moving between these two positions, the plunger 56 will be caused to pass through the cylindrical chamber 32*a*. If desired, the plunger 56 can be caused to move to a position within the cylindrical conduit 50 in which it is located at or adjacent the lower end 50*a* of the cylindrical conduit 50.

The apparatus described above operates in the following manner. Dirt-laden air is caused to enter the apparatus 10 along the dirt-laden air inlet 16. The dirt-laden air then enters the cyclone body 12 in a tangential manner and, in view of the orientation of the inlet 16, the dirt-laden air follows a general helical path around the interior surface of the cyclone body 12 from the upper end thereof to the lower end thereof. As the airflow reverses its direction and begins to travel upwardly from the lower end of the cyclone body 12 towards the upper end thereof, dirt and dust is separated from the main airflow. The main airflow passes through the perforations 22 located in the shroud 20 and exits the apparatus 10 via the outlet 18.

Dirt and dust particles which are separated from the main airflow in the lower end of the cyclone body 12 continue to be carried in a circular path around the lower end of the cyclone body 12. The dirt and dust particles are carried, partly by inertia and partly by the bleeding off of a small amount of the main airflow (which is preferably less than 10% but could be up to 20%), into the mouth portion 30*a* of the entry portion 30 of the dirt collecting 14. The dirt and dust particles are carried along the linear portion 30*b* and around the U-shaped portion 30*c* of the entry portion 30 by the bled air which passes along the entry portion 30. The dirt and dust particles continue to pass along the entry portion 30 until they arrive in the collecting portion 32 of the dirt collecting chamber 14. Because the dimensions of the cylindrical chamber 32*a* are somewhat larger than the dimensions of the entry portion 30, some inertial separation takes place and dirt and dust particles are deposited within the cylindrical chamber 32*a*.

The bled air which has passed along the entry portion 30 and into the collecting portion 32 then passes through the apertures 40 in the wall 36 and into the air return passage 42. The passage of the air through the apertures 40 also encourages further separation of the dirt and dust particles from the bled air and any remaining large dirt and dust particles are now retained within the cylindrical chamber 32*a*. Meanwhile, the bled air passes along the air return duct 42 and is reintroduced into the cyclone body 12 via the aperture 48. The inclination of the longitudinal direction of the aperture 48 to the direction of flow A within the cyclone body 12 encourages the bled air to be returned to the interior of the cyclone body 12 as explained above in a manner which causes least disruption to the circulating main airflow within the cyclone body 12. The angle β is, however, sufficiently large to allow the passage of the main airflow across the opening of the aperture 48 to cause the bled air to be sucked out of the air return duct 42 and into the interior of the cyclone body 12 by means of the venturi effect.

It is preferred that the aperture 48 is located in the wall of the cyclone body 12 close to the mouth portion 30*a* of the entry portion 30. This is advantageous because, if there is any disruption to the main airflow caused by the bleeding of a small amount of air into the dirt-collecting portion 14 and its return to the interior of the cyclone body 12, then the location of the causes of this disruption are confined to a relatively small portion of the circumference of the cyclone body 12.

In order to empty the cylindrical chamber 32*a* of the collecting portion 32 when it is full, the apparatus 10 is first switched off. A receptacle 60 is then placed beneath the lower end 50*a* of the cylindrical conduit 50. The floor 52 of the cylindrical chamber 32*a* is then moved, by whatever means are provided, to the open position shown in dotted lines in FIG. 2. The plunger 56 is then moved from the position shown in FIG. 1 in a downward direction so that the plunger 56 passes through the cylindrical chamber 32*a*. Dirt and dust collected in the cylindrical chamber 32*a* is therefore removed from the cylindrical chamber 32*a* and dropped or pushed into the cylindrical conduit 50. Dirt and dust which is not adhered to the walls of the cylindrical conduit 50 will fall into the receptacle 60. If desired, the plunger 56 can be moved downward to a position in which it lies adjacent the lower end 50*a* of the cylindrical conduit 50. In this way, substantially all of the dirt and dust previously collected in the cylindrical chamber 32*a* is caused to pass into the receptacle 60. The plunger 56 can then be retracted to its initial position, the floor 52 can be returned to its closed position (shown in bold lines in FIG. 2), and the receptacle 60 can be sealed and disposed of in any convenient manner. The apparatus 10 can then be re-started.

Figure 2:
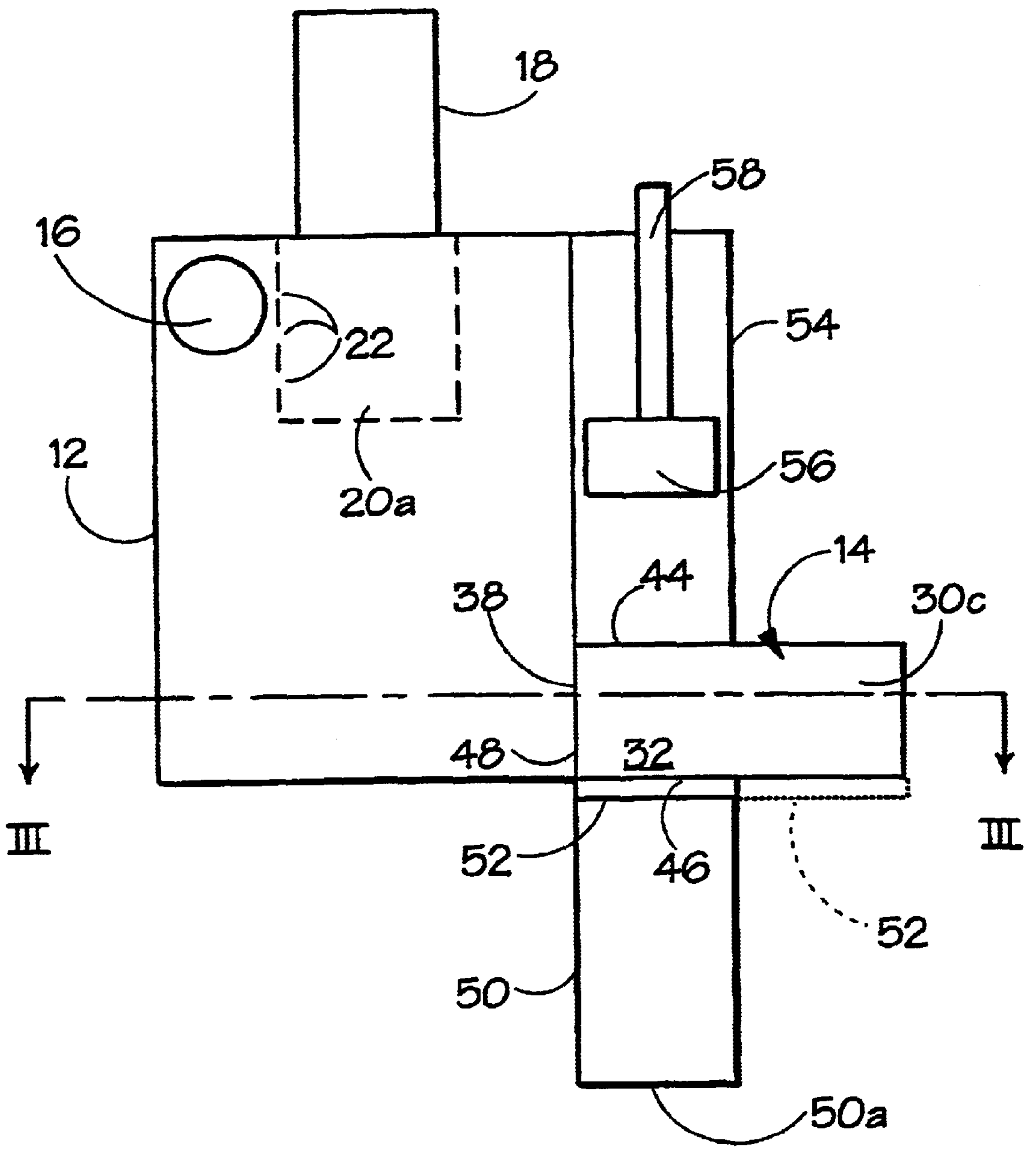
FIG. 2 is a side view of the apparatus of FIG. 1.

It will be appreciated that, although a close contact between the plunger 56 and the walls of the second cylindrical conduit 54 is not shown in FIGS. 1 and 2 for reasons of clarity, the plunger 56 must form a good seal with the walls of the second cylindrical conduit 54. No significant ingress of air must be allowed between the plunger 56 and the second cylindrical conduit 54. This would be detrimental to the operation of the separating apparatus 10. It will also be appreciated that other means of emptying the cylindrical chamber 32*a* will be immediately apparent to a skilled reader. For example, the collecting portion 32 of the dirt-collecting chamber 14 could be formed by a disposable capsule which can be easily and quickly attached to the end of the entry portion 30 remote from the mouth portion 30*a*. The attachment of the capsule could be by adhesive tape, snap fitting details or any other convenient means. Instead of providing the cylindrical conduits 50, 54 and the plunger arrangement, the capsule could merely be removed when it is full and thrown away. In short, the manner of removal of the dirt and dust collected in the cylindrical chamber 32*a* is not an essential part of the present invention.

The advantages of collecting dirt and dust separated in a cyclone in a location which is remote from the cyclone body 12 are well known. The advantage of the present arrangement is that, by bleeding a small amount of the airflow along the entry portion 30 of the dirt-collecting portion 12, the separated dirt and dust requiring to be transported to the collecting chamber 32 is more reliably deposited therein. Closed collector portions can give rise to unpredictable turbulence within the collector portion which in turn can lead to deposition of dirt and dust in inconvenient locations within the dirt-collecting portion. By providing an outlet for the bled air back into the cyclone body 12, a smoother, more predictable airflow pattern can be established.

Other variations and alternatives will be apparent to a skilled reader. For example, it is not essential that the cyclone body 12 is cylindrical in shape; it could be frustoconical. It is also envisaged that the apparatus illustrated and described above could form part of a cyclonic separating apparatus in which one or more further cyclonic separators are arranged downstream of the outlet 18 to allow for further cleaning of the dirt and dust which is allowed to exit from the apparatus 10 shown in FIG. 1. Other means of emptying the dirt-collecting portion 12 will also be apparent and are intended to fall within the scope of the present invention. As an example, the receptacle 60 could be slidingly sealed about the lower end 50*a* of the cylindrical conduit 50 and the floor 52 omitted so that dirt and fibers collected in the cylindrical chamber 32*a* fall directly into the receptacle 60. When it is full, the receptacle 60 can be removed and either emptied and returned or replaced. The plunger 56 can also be omitted if desired.

It is envisaged that the apparatus illustrated and described above will be manufactured from plastics materials. However, other appropriate materials suitable for manufacturing the appropriate components can also be used.

In order to make use of the apparatus described above in a cyclonic vacuum cleaner, the dirty-air inlet of the apparatus will communicate with the cleaner head or hose and wand assembly of the vacuum cleaner. The outlet of the apparatus will be connected to a motor/fan unit capable of drawing dirty air into the apparatus via the cleaner head or the hose and wand assembly. One or more further cyclones, capable of separating fine dust from the airflow, may be positioned between the apparatus described above and the motor. The motor may also be protected by one or more filters capable of collecting very fine dust particles. However, the apparatus described above may be used in applications other than vacuum cleaners and has general application in all cases where cyclonic separation is used.

What is claimed is:

1. Cyclonic separating apparatus comprising a cyclone body having an inlet for introducing dirt-laden air into the cyclone body in a tangential manner, a central outlet for conducting cleaned air out of the cyclone body, a dirt-collecting chamber having an entry portion communicating with the interior of the cyclone body and a collecting portion, and an air return duct having a first end communicating with the collecting portion of the dirt-collecting chamber and a second end communicating with the interior of the cyclone body.

2. Cyclonic separating apparatus as claimed in claim 1, wherein the cyclone body has a first end and a second end, the inlet and the central outlet being located at or adjacent the first end of the cyclone body and the entry portion of the dirt-collecting chamber being located at or adjacent the second end of the cyclone body.

3. Cyclonic separating apparatus as claimed in claim 1 or 2, wherein the second end of the air return duct communicates with the interior of the cyclone body at a point which is circumferentially spaced from the entry portion of the dirt-collecting chamber.

4. Cyclonic separating apparatus as claimed in claim 3, wherein the point at which the second end of the air return duct communicates with the interior of the cyclone body is downstream of the entry portion of the dirt-collecting chamber, seen in the direction of rotation of incoming dust-laden air when the apparatus is in use.

5. Cyclonic separating apparatus as claimed in claim 3, wherein the circumferential spacing of the point at which the second end of the air return duct communicates with the interior of the cyclone body from the entry portion of the dirt collecting chamber is less than 40°.

6. Cyclonic separating apparatus as claimed in claim 5, wherein the circumferential spacing of the point at which the second end of the air return duct communicates with the interior of the cyclone body from the entry portion of the dirt collecting chamber is substantially 15°.

7. Cyclonic separating apparatus as claimed in claim 2, wherein the first end of the air return duct communicates with the collecting portion of the dirt-collecting chamber via a perforated screen.

8. Cyclonic separating apparatus as claimed in claim 7, wherein the perforated screen is formed by a portion of a wall delimiting the collecting portion of the dirt collecting chamber.

9. Cyclonic separating apparatus as claimed in claim 8, wherein the said portion of the wall of the collecting chamber has a plurality of apertures formed therein.

10. Cyclonic separating apparatus as claimed in claim 1, wherein the entry portion of the dirt-collecting chamber communicates with the interior of the cyclone body in a tangential manner.

11. Cyclonic separating apparatus as claimed in claim 2, wherein the second end of the air return duct approaches the interior of the cyclone body in a direction which is inclined at an acute angle to the direction of flow within the cyclone body at the point of communication therewith.

12. Cyclonic separation apparatus as claimed in claim 11, wherein said acute angle is between 20° and 50°.

13. Cyclonic separation apparatus as claimed in claim 12, wherein said acute angle is substantially 30°.

14. Cyclonic separation apparatus as claimed in claim 1, wherein the dirt-collecting chamber further comprises means for removing collected dirt therefrom.

15. Cyclonic separating apparatus as claimed in claim 14, wherein the means for removing collected dirt from the dirt-collecting chamber comprises an openable outlet conduit communicating with the collecting portion and a plunger movable from a stored position, through the collecting portion and into the outlet conduit so as to move collected dirt from the collecting portion into the outlet conduit.

16. Cyclonic separating apparatus as claimed in claim 1, wherein a perforated shroud is located inside the cyclone body so as to surround the central outlet.

17. Cyclonic separating apparatus as claimed in claim 16, wherein the shroud is cylindrical.

18. Cyclonic separating apparatus as claimed in claim 1, wherein the cyclone body is generally cylindrical.

19. A vacuum cleaner comprising the cyclonic separation apparatus according to claim 1.

20. A method of separating dirt from dirt-laden air comprising:

a) introducing the dirt-laden air to the interior of a cyclone body in a tangential manner to cause separation of the dirt therein by cyclonic means;

b) passing the separated dirt into a dirt-collecting chamber separate from the cyclone body, and collecting the separated dirt in a collecting portion of the dirt-collecting chamber, and c) reintroducing air entering the dirt-collecting chamber to the interior of the cyclone body through an air return duct communicating with the collecting portion of the dirt-collecting chamber and with the interior of the cyclone body.

21. A method as claimed in claim 20, wherein air entering the air return duct is caused to pass through a perforated screen.

22. A method as claimed in claim 20 or 21, wherein air which is reintroduced to the interior of the cyclone body is caused to approach said interior in a direction which is inclined at an acute angle to the direction of flow within the cyclone body at the point of reintroduction.

23. A method as claimed in claim 22, wherein said acute angle is between 20° and 50°.

24. A method as claimed in claim 23, wherein said acute angle is substantially 30°.

25. A method as claimed in claim 20, wherein the proportion of the dirt-laden air which passes through the dirt-collecting chamber is less than 20%.

26. A method as claimed in claim 25, wherein the proportion of the dirt-laden air which passes through the dirt-collecting chamber is less than 10%.

* * * * *